United States Patent
Colin et al.

(10) Patent No.: US 8,004,230 B2
(45) Date of Patent: Aug. 23, 2011

(54) DEVICE FOR CONTROLLING A ROTARY PRESS

(75) Inventors: Alain Colin, Lamorlaye (FR); Yves Caulier, Montataire (FR); Emmanuel Lebeuf, Pont Sainte Maxence (FR); François Vidaillac, Frocourt (FR)

(73) Assignee: Goss International Montataire SA, Montataire (FR)

( * ) Notice: Subject to any disclaimer, the term of this patent is extended or adjusted under 35 U.S.C. 154(b) by 874 days.

(21) Appl. No.: 12/011,859

(22) Filed: Jan. 30, 2008

(65) Prior Publication Data

US 2008/0196611 A1 Aug. 21, 2008

(30) Foreign Application Priority Data

Jan. 31, 2007 (FR) ..................................... 07 00681

(51) Int. Cl.
*G05B 1/06* (2006.01)
(52) U.S. Cl. ........ 318/652; 318/400.4; 101/36; 101/216
(58) Field of Classification Search .................... 101/36, 101/216; 318/400.4, 560, 601, 652, 661, 318/400.05, 400.14, 807, 503; 358/539; 100/223
See application file for complete search history.

(56) References Cited

U.S. PATENT DOCUMENTS

| 6,215,119 | B1 * | 4/2001 | Markham et al. ........ 250/231.14 |
| 6,354,214 | B1 * | 3/2002 | Tokiwa .......................... 101/484 |
| 6,539,860 | B2 * | 4/2003 | Tsunashima et al. .......... 101/181 |
| 6,679,172 | B2 * | 1/2004 | Tokiwa .......................... 101/484 |
| 6,850,021 | B1 * | 2/2005 | Golownia et al. ............. 318/432 |
| 7,417,392 | B2 * | 8/2008 | Wirtz et al. .................... 318/432 |
| 7,531,973 | B2 * | 5/2009 | Baumann et al. ......... 318/400.01 |
| 7,719,224 | B2 * | 5/2010 | Quan et al. ..................... 318/601 |
| 2007/0181018 | A1 | 8/2007 | Colin et al. |

FOREIGN PATENT DOCUMENTS

| DE | 8314827 | 9/1985 |
| DE | 19727824 | 11/1998 |
| WO | WO 2005/080081 A1 | 9/2005 |

* cited by examiner

*Primary Examiner* — Walter Benson
*Assistant Examiner* — Antony M Paul
(74) *Attorney, Agent, or Firm* — Davidson, Davidson & Kappel, LLC

(57) ABSTRACT

A device for controlling a rotary press is provided. The device includes a main evaluation unit which is provided with a main signal inlet, at least a first main signal outlet and a first main transformation device. The device further includes a master generator which is capable of generating a master signal which represents a reference value of the rotary press, and a first interface which is capable of generating a first periodic signal in accordance with the master signal and transmitting this first periodic signal to the main signal inlet.

14 Claims, 2 Drawing Sheets

*FIG.1*

DEVICE FOR CONTROLLING A ROTARY PRESS

This claims the benefit of French Patent Application No. 07 00681, filed on Jan. 31, 2007 and hereby incorporated by reference herein.

The present invention relates to a device for controlling a rotary press, of the type including:

a first signal generator which is capable of generating a first periodic signal which has a specific frequency and phase, a main evaluation unit which is provided with a main signal inlet which is capable of receiving a main periodic input signal, at least a first main signal outlet and a first main transformation device which is capable of generating a first periodic output signal at the first main signal outlet in accordance with the main periodic input signal.

BACKGROUND TO THE INVENTION

Document WO 2005/08 0081 discloses a rotary element for a printing press which is provided with an encoder. The encoder is capable of generating a first periodic signal during the rotation of the rotary element. The encoder is connected to an evaluation unit which comprises at least one synthesiser for generating a second periodic signal which has a resolution, frequency or phase ratio relative to the first signal.

With this rotary element, the encoder is a physical encoder which is constituted, for example, by an encoder plate and an encoder sensor. The encoder sensor generates the first periodic signal in accordance with the rotation of the encoder plate.

The disadvantage of this rotary element is that the speed variations of the element are propagated in the evaluation unit and influence the output signal generated by the evaluation unit in a negative manner.

SUMMARY TO THE INVENTION

An object of the invention is to overcome these disadvantages and to provide a control device for a rotary press which allows the precision of the control to be increased.

To this end, the invention relates to a control device of the type indicated, wherein it includes:

a master generator which is capable of generating a master signal which represents a reference value, such as the position, the position increment and/or the speed of the rotary press, and wherein a first signal generator is a first interface which is capable of generating a first periodic signal in accordance with the master signal, and is capable of transmitting the first periodic signal to a main evaluation unit as a main input signal.

According to specific embodiments, the invention includes one or more of the following features:

the first interface is a virtual encoder which is capable of generating a first encoder signal as a first periodic signal on the basis of the master signal;

a first main transformation device is capable of generating the first periodic output signal, at least one of the group of characteristics including the resolution, frequency, and phase ratio of the first periodic output signal being different from the main input signal;

the main evaluation unit includes a second main transformation device which is capable of generating a second periodic output signal at a second main signal outlet in accordance with the main periodic input signal, and the second main transformation device is capable of generating the second main periodic output signal, at least one of the group of characteristics including the resolution, frequency and phase ratio of the second main periodic output signal being different from the main periodic input signal and at least one of the group of characteristics including the resolution, frequency, and phase ratio of the second main periodic output signal being different from the first periodic output signal;

the control device includes an auxiliary evaluation unit which is provided with an auxiliary signal inlet which is capable of receiving an auxiliary periodic input signal, at least a first auxiliary signal outlet and at least one auxiliary transformation device which is capable of generating a first auxiliary periodic output signal at the first auxiliary signal outlet in accordance with the auxiliary periodic input signal;

the auxiliary transformation device is capable of generating the first auxiliary periodic output signal, at least one of the group of characteristics including the resolution, frequency, and phase ratio of the first auxiliary periodic output signal being different from the auxiliary periodic input signal;

the auxiliary signal inlet is capable of receiving the first periodic signal generated by the first signal generator as an auxiliary input signal;

the control device comprises a second signal generator which is capable of generating the auxiliary periodic input signal in accordance with the master signal;

the second signal generator is a second interface, in particular a second virtual encoder which is capable of generating a second encoder signal as an auxiliary periodic input signal;

the first main signal outlet is connected to a device for controlling and/or commanding a printing unit and the first auxiliary signal outlet is connected to a device for controlling and/or commanding a folding device; and at least one of the transformation devices includes a command inlet and is capable of modifying at least one of the group of characteristics including the resolution, frequency, and phase of the associated output signal in accordance with a command signal arriving at the command inlet.

The invention will be better understood from a reading the following description, given purely by way of example and with reference to the drawings.

DESCRIPTION OF PREFERRED EMBODIMENTS

Figure 1:
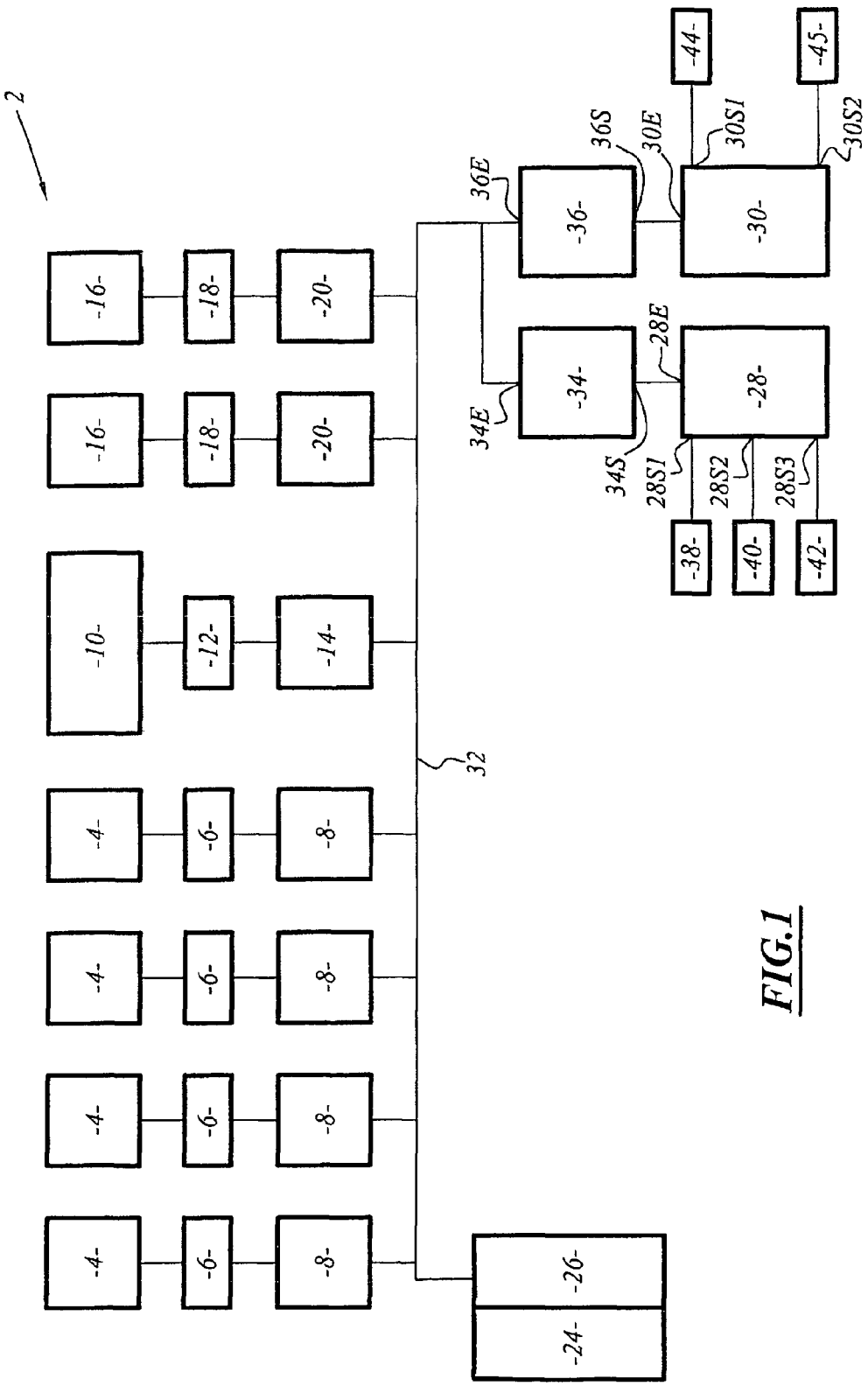
FIG. 1 is a schematic view of a printing press according to the invention.

FIG. 1 schematically illustrates a rotary printing press 2.

Printing press 2 provides four printing units 4, each of which is driven by a motor 6. Each motor 6 is controlled by a printing converter 8 which is either a frequency converter or a voltage converter.

The printing press 2 is further provided with a dryer 10 which is driven by a motor 12 and controlled by a dryer converter 14. This dryer converter 14 is also either a frequency converter or a voltage converter.

The printing press 2 is also provided with two folding devices 16, each of which is driven by a motor 18 which is controlled by a folding device converter 20.

The printing press 2 further provides a control unit 22 which is constituted by a programmable logic computer PLC 24 and a frequency modulator module 26.

This frequency modulator module 26 is capable of generating a master signal which represents a reference value, such as the absolute position of the rotary elements of the press, the rotation speed of the rotary elements or a position increment of the rotary elements. The master signal is transmitted in the form of a periodic signal which has a specific frequency and amplitude. The master signal is preferably a digital signal.

The master signal is addressed to each of the elements of the rotary press which must rotate in a synchronous manner. To this end, each module has a precise address to which the master signal is sent.

Furthermore, the printing press 2 is provided with a main evaluation unit 28 and an auxiliary evaluation unit 30. These two main and auxiliary evaluation units 30 are formed by two separate distribution cards.

The converters 8, 14, 20 and the frequency modulator 26 are connected to a bus 32 which constitutes a network.

The main evaluation unit 28 is connected to the bus 32 by means of a main virtual encoder 34 and the auxiliary evaluation unit 30 is connected to the bus 32 by means of an auxiliary virtual encoder 36.

Each of the virtual encoders 34, 36 includes a signal inlet 34E, 36E and a signal outlet 34S, 36S. The main virtual encoder 34 is capable of generating a periodic signal which has a specific frequency and phase in accordance with the master periodic signal which is transmitted by the modulator 26. The main virtual encoder 34 is capable of transmitting this periodic signal generated to the main evaluation unit 28 as a main input signal.

The auxiliary virtual encoder 36 is capable of generating a periodic signal which has a specific frequency and a specific phase in accordance with the same master periodic signal transmitted by the modulator 26 and is capable of transmitting this periodic signal as an auxiliary input signal to the auxiliary evaluation unit 30.

It should be noted that the periodic signal generated by the virtual encoders 34 and 36 is identical to a signal generated by a physical encoder which records the rotation of an element of the printing press.

Figure 2:
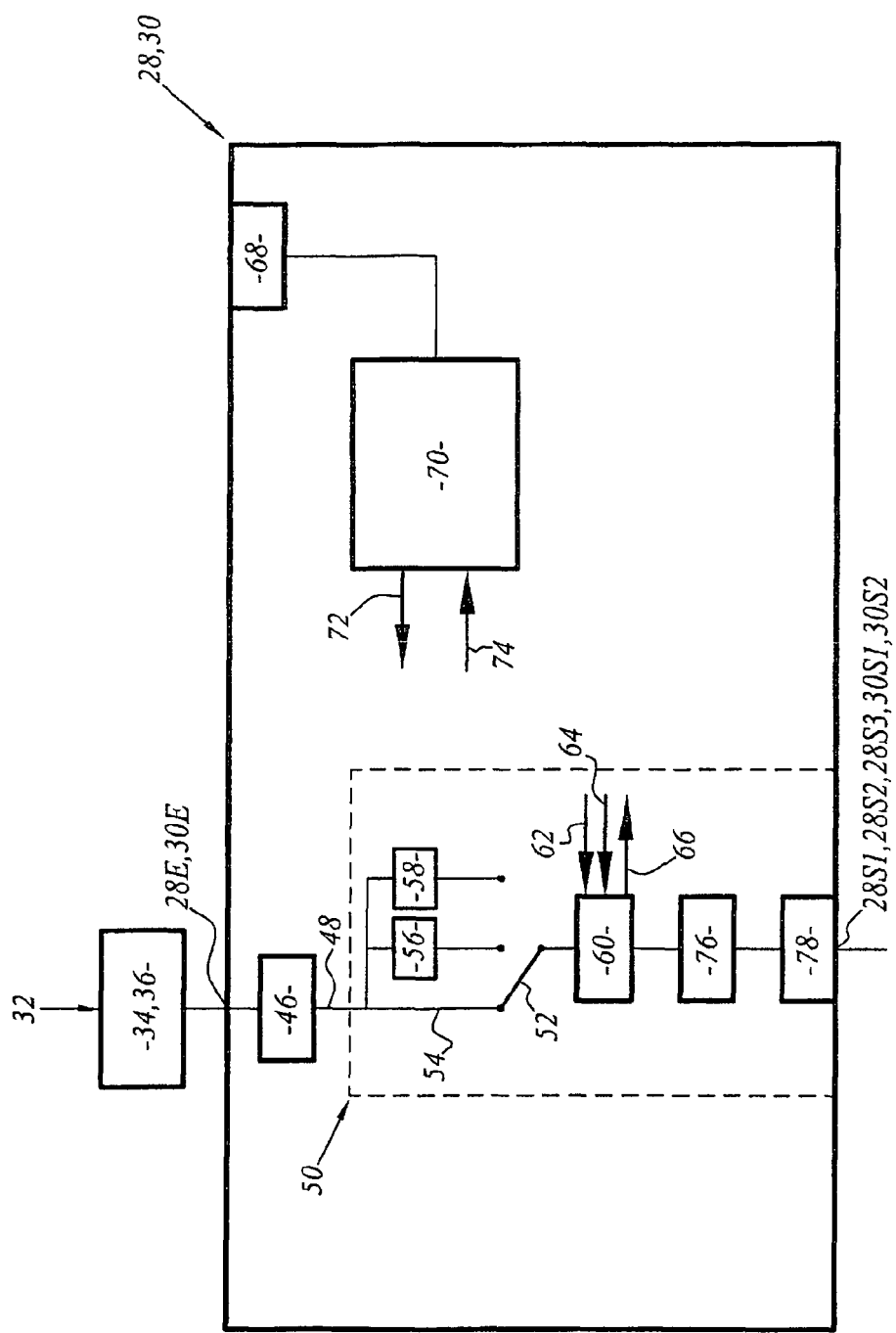
FIG. 2 is a schematic view of an evaluation unit according to the invention.

FIG. 2 schematically illustrates the evaluation unit 28 or 30 in accordance with a preferred embodiment of the invention. The main evaluation unit 28 and the auxiliary evaluation unit 30 are configured in an identical manner. Consequently, the features thereof are explained with reference to a single FIG. 2. The evaluation unit 28, 30 provides a signal inlet 28E, 30E.

The main evaluation unit 28 is provided, for example, with three signal outlets 28S1, 28S2, 28S3. Each unit may be provided with 10 signal outlets. The auxiliary evaluation unit 30 is provided, for example, with two signal outlets 30S1, 30S2.

The periodic signal transmitted by the encoder 34, 36 arrives at the associated signal inlet 28E, 30E, for example, in a four-phase decoder 46, so that the decoded signal is transmitted on an internal signal line 48.

The internal signal line 48 branches into a number of identical operational units 50. The number of these operational units 50 corresponds to the number of signal outlets available at the evaluation unit 28, 30. For reasons of clarity, only a single operational unit 50 is illustrated in FIG. 2. In the present case, the main evaluation unit 28 provides three such operational units 50. Each of the operational units 50 is connected to one of the associated signal outlets 28S1, 28S2 and 28S3. The auxiliary evaluation unit 30 provides two operational units 50, each of which is connected to one of the signal outlets 30S1, 30S2.

The operational unit 50 includes a commutator 52 which allows switching between a direct line 54, a first division device 56 which is capable of dividing by a factor of 2 and a second division device 58 which is capable of dividing by a factor of 4. The signal which is decoded and optionally divided is transmitted to a synthesiser 60 so that, in accordance with the frequency and/or the phase of the periodic signal transmitted by the virtual encoder 34, 36, the synthesiser 60 generates a second periodic signal which has a specific resolution ratio, frequency ratio and phase ratio relative to the periodic signal of the encoder 34. The information relating to the desired resolution 62 and/or the desired phase shift 64 between the periodic signal and the second periodic signal is entered into the synthesiser 60 via corresponding inlets. The position 66 of the second periodic signal, for example, the phase shift, is provided by the synthesiser 60 for the purposes of monitoring.

The parameters 62, 64 of each synthesiser 60 of each operational unit 50 may be modified by means of a control interface 68 which is, for example, an RS 232 interface.

The evaluation unit 28 also provides a data memory 70, from which reference data 72 can be transmitted to the synthesiser 60. The position data 74 provided by each of the synthesisers 60 are stored in the memory 70.

In each of the operational units 50, a signal generated by the associated synthesiser 60 is amplified by means of an amplifier 76 before being transmitted via an output interface 78 to the associated signal outlet 28S1, 28S2, 28S3 or 30S1, 30S2.

Each of the signal outlets 28S1, 28S2, 28S3 of the main evaluation unit 28 is connected to a device which is controlled by means of a clock pulse signal. In this manner, the signal outlet 28S1 generates an encoder signal which is transmitted to an encoder 38.

This encoder 38 receives, for example, 2048 pulses per revolution. A stroboscope 40 receives 512 pulses per revolution. A register control device 42 also receives 2048 pulses per revolution but at a lower voltage than that of the redundant encoder 38. The main evaluation unit 28 thus generates signals at the outlets 28S1, 28S2, 28S3 which provide the reference of the printing units 4. These elements thus have access to a signal which is referenced purely on the position of the printing groups.

The auxiliary evaluation unit 30 thus generates signals at the outlets 30S1, 30S2 which are referenced on the position of at least one of the folding devices 16. The outlet 30S1 is connected to a device 44 for applying adhesive to the printed product and the outlet 30S2 is connected to a cutting control device 45. These applications thus receive a signal which is in alignment with the position of the folding devices 16.

Owing to the new concept for use of two evaluation units 28, 30, each of which processes a signal which is referenced relative to a specific component of the press, that is to say, a printing unit or folding device, the distribution of the signals is facilitated.

Therefore, the generation of one output signal does not influence the generation of another output signal which increases the precision of the signals.

In a variant, the auxiliary periodic input signal may be generated by a module located in the unit 26, based on the master signal which is dephased by an actual position angle between the printing groups and the folding device(s).

What is claimed is:

1. A device for controlling a rotary press, of the type comprising:
   a first signal generator capable of generating a first periodic signal having a specific frequency and phase;
   a main evaluation unit provided with a main signal inlet capable of receiving a main periodic input signal, at least a first main signal outlet and a first main transformation device capable of generating a first periodic output signal at the first main signal outlet in accordance with the main periodic input signal; and a master generator capable of generating a master signal representing a reference value, such as the position, the position increment and/or the speed of the rotary press; and an auxiliary evaluation unit provided with an auxiliary signal inlet capable of receiving an auxiliary periodic input signal, at least a first auxiliary signal outlet and at least one auxiliary transformation device capable of generating a first auxiliary periodic output signal at the first auxiliary signal outlet in accordance with the auxiliary periodic input signal;

the first signal generator being a first interface capable of generating the first periodic signal in accordance with the master signal, and being capable of transmitting the first periodic signal to the main evaluation unit as a main input signal.

2. The control device according to claim 1, wherein the first interface is a virtual encoder capable of generating a first encoder signal as a first periodic signal on the basis of the master signal.

3. The control device according to claim 2, wherein the first main transformation device is capable of generating the first periodic output signal, at least one of the group of characteristics including the resolution, frequency, and phase ratio of the first periodic output signal being different from the main input signal.

4. The control device according to claim 2, wherein the main evaluation unit includes a second main transformation device capable of generating a second periodic output signal at a second main signal outlet in accordance with the main periodic input signal, and the second main transformation device is capable of generating the second main periodic output, at least one of the group of characteristics including the resolution, frequency and phase ratio of the second main periodic output signal being different from the main periodic input signal and at least one of the group of characteristics including the resolution, frequency, and phase ratio of the second main periodic output signal being different from the first periodic output signal.

5. The control device according to claim 3, wherein the main evaluation unit includes a second main transformation device capable of generating a second periodic output signal at a second main signal outlet in accordance with the main periodic input signal, and the second main transformation device is capable of generating the second main periodic output, at least one of the group of characteristics including the resolution, frequency, and phase ratio of the second main periodic output signal being different from the main periodic input signal and at least one of the group of characteristics including the resolution, frequency, and phase ratio of the second main periodic output signal being different from the first periodic output signal.

6. The control device according to claim 1, wherein the first main transformation device is capable of generating the first periodic output signal, at least one of the group of characteristics including the resolution, frequency, and phase ratio of the first periodic output signal being different from the main input signal.

7. The control device according to claim 6, wherein the main evaluation unit includes a second main transformation device capable of generating a second periodic output signal at a second main signal outlet in accordance with the main periodic input signal, and the second main transformation device is capable of generating the second main periodic output, at least one of the group of characteristics including the resolution, frequency and phase ratio of the second main periodic output signal being different from the main periodic input signal and at least one of the group of characteristics including the resolution, frequency, and phase ratio of the second main periodic output signal being different from the first periodic output signal.

8. The control device according to claim 1, wherein the main evaluation unit includes a second main transformation device capable of generating a second periodic output signal at a second main signal outlet in accordance with the main periodic input signal, and the second main transformation device is capable of generating the second main periodic output signal, at least one of the group of characteristics including the resolution, frequency and phase ratio of the second main periodic output signal being different from the main periodic input signal and at least one of the group of characteristics including the resolution, frequency, and phase ratio of the second main periodic output signal being different from the first periodic output signal.

9. The control device according to claim 1, wherein the auxiliary transformation device is capable of generating the first auxiliary periodic output signal, at least one of the group of characteristics including the resolution, frequency, and phase ratio of the first auxiliary periodic output signal being different from the auxiliary periodic input signal.

10. The control device according to claim 1, wherein the auxiliary signal inlet is capable of receiving the first periodic signal generated by the first signal generator as an auxiliary input signal.

11. The control device according to claim 1, further comprising a second signal generator capable of generating the auxiliary periodic input signal in accordance with the master signal.

12. The control device according to claim 11, wherein the second signal generator is a second interface, in particular a second virtual encoder capable of generating a second encoder signal as an auxiliary periodic input signal.

13. The control device according to claim 1, wherein the first main signal outlet is connected to a device for controlling and/or commanding a printing unit and the first auxiliary signal outlet is connected to a device for controlling and/or commanding a folding device.

14. The control device according to claim 1, wherein at least one of the transformation devices includes a command inlet and is capable of modifying at least one of the group of characteristics including the resolution, frequency, and phase of the associated output signal in accordance with a command signal arriving at the command inlet.

* * * * *